United States Patent
Brunnmair

(10) Patent No.: US 10,174,998 B2
(45) Date of Patent: Jan. 8, 2019

(54) DEVICE AND METHOD FOR PRODUCING AN EXPANDED GRANULAR MATERIAL

(71) Applicant: Binder + Co AG, Gleisdorf (AT)

(72) Inventor: Ernst Erwin Brunnmair, Graz (AT)

(73) Assignee: Binder + Co Ag, Gleisdorf (AT)

( * ) Notice: Subject to any disclaimer, the term of this patent is extended or adjusted under 35 U.S.C. 154(b) by 0 days.

(21) Appl. No.: 15/038,655

(22) PCT Filed: Nov. 25, 2014

(86) PCT No.: PCT/EP2014/075536
§ 371 (c)(1),
(2) Date: May 23, 2016

(87) PCT Pub. No.: WO2015/075263
PCT Pub. Date: May 28, 2015

(65) Prior Publication Data
US 2016/0305710 A1    Oct. 20, 2016

(30) Foreign Application Priority Data

Nov. 25, 2013    (EP) .................... 13194303

(51) Int. Cl.
*F27B 1/02*    (2006.01)
*F27B 1/20*    (2006.01)
(Continued)

(52) U.S. Cl.
CPC .............. *F27B 1/20* (2013.01); *C04B 20/066* (2013.01); *F27B 1/005* (2013.01); *F27D 3/0033* (2013.01); *F27D 3/10* (2013.01)

(58) Field of Classification Search
CPC .... F27B 1/00; F27B 1/005; F27B 1/06; F27B 1/20; C03B 5/12; C03B 5/0336; C04B 2/12; C21D 9/005
See application file for complete search history.

(56) References Cited

U.S. PATENT DOCUMENTS

| 2,503,555 A * | 4/1950 | Lykken | C22B 1/10 |
| | | | 122/20 A |
| 3,046,607 A * | 7/1962 | Blaha | C04B 20/066 |
| | | | 264/15 |

(Continued)

FOREIGN PATENT DOCUMENTS

| CN | 1517285 A | 8/2004 |
| CN | 101200377 A | 6/2008 |

(Continued)

OTHER PUBLICATIONS

European Patent Office, "International Search Report", issued in connection to International Application PCT/EP2014/075536, dated May 8, 2015, 11 pages, May 8, 2015.

(Continued)

*Primary Examiner* — Gregory A Wilson
(74) *Attorney, Agent, or Firm* — McKee, Voorhees & Sease, PLC

(57) ABSTRACT

The invention relates to an apparatus (10) for producing an expanded granulate from sand-grain-shaped material (1), comprising a furnace (2) with a substantially vertically extending furnace shaft (3) and a feed device (5) arranged above or in the upper region of the furnace shaft (3) for feeding the sand-grain-shaped material (1) to the furnace shaft (3).

In order to achieve uniform expansion of the sand-grain-shaped material, the feed device (8) is formed to introduce the sand-grain-shaped material (1) in form of at least one downwardly falling curtain into the upper region of the furnace shaft (3), wherein the drop section (4) of the curtain (25) lies in a decentralised, preferably peripheral region of the furnace shaft cross-section.

(Continued)

The invention also relates to a method for producing an expanded granulate from sand-grain-shaped mineral material.

29 Claims, 5 Drawing Sheets

(51) Int. Cl.
  *C04B 2/12* (2006.01)
  *C04B 20/06* (2006.01)
  *F27B 1/00* (2006.01)
  *F27D 3/00* (2006.01)
  *F27D 3/10* (2006.01)

(56) References Cited

U.S. PATENT DOCUMENTS

| | | | | |
|---|---|---|---|---|
| 3,889,393 | A * | 6/1975 | Thomas | C04B 2/10 34/167 |
| 4,256,451 | A * | 3/1981 | Johnson, Jr. | F27B 7/2016 34/171 |
| 4,289,481 | A * | 9/1981 | Yano | F26B 17/124 110/261 |
| 5,013,237 | A * | 5/1991 | Bergounhon | C04B 11/028 34/171 |
| 5,401,166 | A * | 3/1995 | Mallek | F23G 5/027 110/315 |
| 8,876,525 | B2 * | 11/2014 | Euston | C04B 2/12 432/14 |
| 2008/0213708 | A1 * | 9/2008 | Cristea | C04B 2/12 431/7 |

FOREIGN PATENT DOCUMENTS

| | | |
|---|---|---|
| CN | 201129916 Y | 10/2008 |
| CN | 201250188 Y | 6/2009 |
| CN | 101726176 A | 6/2010 |
| CN | 201942616 U | 8/2011 |
| CN | 102557506 A | 7/2012 |
| CN | 202885493 U | 4/2013 |
| CN | 103889922 A | 6/2014 |
| EP | 13194303.7 | 11/2013 |
| GB | 902169 | 7/1962 |
| RU | 2214570 C2 * | 10/2003 |
| WO | 2013053635 A1 | 4/2013 |
| WO | 2015075263 A1 | 5/2015 |

OTHER PUBLICATIONS

State Intellectual Property Office of the People's Republic of China Search Report, Application No. 201480058961.6, Binder + Co. Ag filed Nov. 25, 2013.
Paul Wort S.A., English Translation of CN 1517285A, published Aug. 4, 2004.
Jianping Deng, "Process for Firing Pottery and Ceramicite by Reducing Flame and Kiln", English Translation of CN 101200377A, published Jun. 18, 2008.
Kejian He, "Vitrifying and Expanding Furnace of Pitchstone", English Translation of CN 101726176A, published Jun. 9, 2010.
Xinyang Sitong Mechanical Mfg. Co., "Complete Processing Equipment of Coal Gas Expanded Perlite", English Translation of CN 102557506A, published Jul. 11, 2012.
Binder Co. Ag., "Method for the Closed-Cell Expansion of Mineral Material", English Translation of CN 103889922A, published Jun. 25, 2014.
Zhengzhou Haote Thermoelectric, "Well Type Closed Cell Automatic Control Pearl Stone Swelling Furnace", English Translation of CN201129916, published Oct. 8, 2008.
Yandong Chen, "Electrical Heating Expansion Furnace", English Translation of CN 201250188, published Jun. 3, 2009.
Yiwu Liu, "Internal Combustion and Beam Type Vertical Lime Kiln", English Translation of CN201942616U, published Aug. 24, 2011.
Luoyang Antuo Kiln Environmental Prot. Co. Ltd., "Gas Energy-Saving Type Expanding Equipment for Perlite", English Translation of CN 202885493, published Apr. 17, 2013.

* cited by examiner

DEVICE AND METHOD FOR PRODUCING AN EXPANDED GRANULAR MATERIAL

BACKGROUND OF THE INVENTION

The invention relates to an apparatus for producing an expanded granulate from sand-grain-shaped material, comprising a furnace with a substantially vertically extending furnace shaft and a feed device arranged above or in the upper region of the furnace shaft for feeding the sand-grain-shaped material to the furnace shaft, wherein the feed device is formed to introduce the sand-grain-shaped material in form of at least one downwardly falling curtain into the upper region of the furnace shaft, wherein the drop section of the curtain lies in a decentralised, preferably peripheral region of the furnace shaft cross-section, and to a method for producing an expanded granulate.

DESCRIPTION OF THE PRIOR ART

Such an apparatus or method is disclosed in WO 2013/053635 A1. Its object is to adjust a closed surface of the expanded granulate in a controllable manner so that the expanded granulate does not show any or hardly any hygroscopicity, Furthermore, it is intended to provide the possibility to influence the surface structure of the expanded granulate and thus its roughness in a purposeful manner. The specification thus proposes to provide several heating elements which are arranged along the drop section of the sand-grain-shaped material and can be controlled independently from each other, and to carry out temperature detection along the drop section, wherein the heating elements are controlled beneath the region in which the expansion process occurs depending on the detected temperature.

As a result of the vertical orientation of the expansion shaft and the additional introduction or extraction by suction of process gases accompanying the expansion process, flows which act on the sand-grain-shaped material occur within the shaft. If the shaft were sealed at the top, flow conditions would occur in which an upward flow (boundary layer flow) would cease completely in a number of sections of the expansion shaft, which would inevitably lead to caking of particles on the wall of the expansion shaft, and furthermore also to different dwell times of the individual sand grains in the shaft and consequently to an expansion quality with an extremely high level of different expansion degrees of the individual particles.

Even currently known solutions with additional introduction or suction of process gases accompanying the expansion process have not managed to provide adequate constant quality of the expanded particles until now.

The irregular expansion process can thus be regarded as the disadvantage of the prior art, which as a result leads to particles that are expanded in differently strong ways or not at all, and to increased caking on the walls. The properties of the granulate with respect to hygroscopicity are thus negatively influenced because control of the expansion process does not reach all particles to a similar extent.

The disadvantage in the use of known solutions of the material feed such as those by means of rotary feeders, chutes or corrugated roll feeders will be explained below in closer detail. A relatively constant distribution of material over the cross-section of the expansion shaft can be achieved by conventional material feeding to the furnace shaft by means of a chute, rotary feeder or corrugated roll feeding. As a result of the flow conditions which vary over the cross-section of the shaft, this would lead to different dwell times however and thus to a different quality of the expanded granulate. The consequence is irregularly expanded granulate, and the fine dust circulating with the upward stream close to the wall would additionally lead to caking in the shaft.

A feed apparatus for furnaces for the expansion of granulate-shaped feed material is known from U.S. Pat. No. 3046607 A. In this case, a cone is connected with its bottom end to a cylindrical collector whose bottom end is formed on its part as an inverted cone which interacts with a conical stop situated therebeneath. The collector comprises annularly arranged openings at its bottom end that is conically inverted, through which the feed material can drop in form of individual, slightly spaced jets into the furnace.

A feed apparatus for furnaces for the expansion of granulate-shaped feed material is also known from GB 902169 A, which feed apparatus also allows the circular feed of the feed material. The feed of the feed material occurs via an annular gap, so that a continuous particle curtain is produced.

It is the object of the underlying present invention to provide an apparatus and a method for producing an expanded granulate from sand-grain-shaped material which does not have the aforementioned disadvantages and is characterized by a regular expansion process that acts similarly on all particles. It is intended to prevent as efficiently as possible with such an apparatus or method that particles occur in the produced granulate which are expanded to a differently strong extent or are not expanded at all. The apparatus is characterized by a simple and reliable construction. The invention can be retrofitted without much effort in existing installations.

SUMMARY OF THE INVENTION

This goal is achieved by an apparatus mentioned initially in such a way that the feed device is formed to introduce the sand-grain-shaped (i.e. pourable) material in form of at least one downwardly dropping curtain into the upper region of the furnace shaft, wherein the drop section of the curtain lies in a decentralised, preferably peripheral region of the furnace cross-section.

The invention is based on the fundamental recognition that the type of feeding can substantially influence the quality of the expansion process. Decentralised means in this case that the curtain does not extend in the central region of the furnace cross-section, but is oriented in the direction of the inner walls of the furnace shaft. This leads to the advantage on the one hand that space is provided for a forced secondary flow in the central region, e.g. by introducing or extracting by suction a process gas such as hot air in the head region of the furnace shaft, which has a positive effect on particles that are conveyed (back) in the upward stream close to the wall, in that a force directed on said particles in the direction of the furnace shaft centre is exerted by the secondary flow, as a result of which caking can be prevented or drastically reduced in comparison with previously known methods. On the other hand, the heat emitted by the inner walls is thus transmitted more efficiently and directly onto the falling material. It is preferable in this connection if the curtain extends in the peripheral, i.e. direct or indirect, boundary region of the furnace cross-section. It is obvious that the furnace cross-section means the cross-section extending normally to the vertical or to the longitudinal extension of the furnace shaft.

The feed device is thus preferably free from outlet openings for the sand-grain-shaped material at least in the central region of the furnace cross-section, so that the furnace shaft is not supplied with sand-grain-shaped material in its central region. It is especially preferable if the feed apparatus, apart from the peripheral region of the furnace cross-section, is free from outlet openings for the sand-grain-shaped material, so that feeding only occurs in the region close to the inner walls.

A preferred embodiment is characterized in that the number of the curtains is at most as high as the number of the inner walls of the furnace shaft, wherein each inner wall of the furnace shaft is at most associated with one curtain. This allows the heating of all material curtains to the same extent.

The advantage of the invention is also that by forming a vertically standing curtain (i.e. the plane of the curtain is parallel to the vertical) from sand-grain-shaped material, feeding is enabled which is purposefully distributed over the shaft cross-section, which means that the feed cross-section of the material in the upper region of the furnace is much smaller than the furnace shaft cross-section. This means in contrast to the prior art that the entire shaft cross-section is no longer evenly supplied, but only specific sections of the shaft cross-section define a drop section. Depending on the dimensioning of the individual components of the apparatus and the flow conditions in the furnace shaft, the position of the flat curtains can be selected or set in such a way that the particles dropping within the curtain are subject to a similar flow. As a result, the uniform dwell time of the particles in the shaft and consequently a uniform expansion quality of the granulate can be ensured. The proportion of adversely expanded sand particles will be reduced considerably, thus increasing the material yield.

Concerning the used material, it is not only possible to use mineral sands in which water is bound as an expanding agent such as pearlite or obsidian sand. It can also concern mineral dust which is mixed with water-containing mineral binder, wherein in this case the water-containing mineral binder acts as an expanding agent. The expansion process can occur in this case as follows: the mineral dust, which consists of relatively small sand grains of a diameter of 20 pm for example, forms larger grains of 500 pm with the binder for example. The surfaces of the sand grains of the mineral dust become plastic at a critical temperature and form closed surfaces of the larger grains or melt into such surfaces. Since the closed surface of a single larger grain is generally usually smaller than the sum total of all surfaces of the individual sand grains of the mineral dust which are involved in the formation of said larger grain, surface energy is gained in this manner and the ratio of surface to volume decreases. At this point, there are larger grains with a closed surface, wherein the grains have a matrix consisting of mineral sand dust and water-containing mineral binder. Since the surfaces of these larger grains are still plastic, the forming water vapour can expand larger grains, which means the water-containing mineral binder is used as an expanding agent. Mineral dust can also be mixed alternatively with an expanding agent, wherein the expanding agent is mixed with mineral binder which preferably contains water. $CaCO_3$ can be used for example as an expanding agent. The expansion process can proceed in this case similar to the one explained above: the mineral dust, which has a relatively small sand-grain size (e.g. 20 pm diameter), forms larger grains (with a diameter of 500 pm for example) with the expanding agent and the mineral binder. When reaching a critical temperature, the surfaces of the sand grains of the mineral dust become plastic and form a closed surface of the larger grains or melt into such a surface. The closed surfaces of the larger grains are still plastic and can now be expanded by the expanding agent. If the mineral binder contains water, said water can act as an additional expanding agent. That is why it is provided according to a preferred embodiment of the method in accordance with the invention that the mineral material with expanding agent concerns a mineral material in which water is bound and acts as an expanding agent, or mineral dust mixed with a water-containing mineral binder which acts as an expanding agent, or mineral dust mixed with an expanding agent which is mixed with a mineral binder, wherein the mineral binder preferably contains water and acts as an additional expanding agent. In order to enable the illustrated method to be carried out as efficiently as possible, it is preferably provided that in addition to a shaft furnace several heating zones are provided with (mutually independently) controllable heating elements and an intelligent regulating and control unit. It preferably controls the heating elements depending on the measured temperatures along the furnace shaft.

The apparatus or method in accordance with the invention can be formed for example as in WO 2013/053635 A1. Its disclosure is therefore included in its entirety in this description.

A preferred embodiment is characterized in that the feed device comprises at least one gap-shaped outlet opening facing the furnace shaft and/or at least one outlet opening arrangement which faces the furnace shaft and consists of several outlet openings arranged adjacently along a line, in order to discharge the sand-grain-shaped material in form of a curtain into the furnace shaft. The gap-shaped outlet opening is elongated and narrow. As a result, thin drop curtains with a linear cross-section are realised, wherein the heat input into the material forming the curtain is evenly distributed. The linear cross-section of the curtains need not be straight, but can also include a curved contour, especially one in the form of a circular line. The linear cross-sections of the curtain(s) are preferably adjusted to the contour of at least one inner wall of the furnace shaft. The width of a curtain preferably corresponds to the width of an inner wall of the furnace shaft.

A preferred embodiment is characterized in that the gap-shaped outlet opening or the outlet opening arrangement extends substantially parallel to at least one inner wall of the furnace shaft. The heat emitted by the inner wall thus reaches every point of the curtain equally, thus additionally promoting the uniformity of the expansion process.

A preferred embodiment is characterized in that the gap-shaped outlet opening or the outlet opening arrangement is arranged in relation to an inner wall of the furnace shaft in such a way that the drop section of the curtain formed by the gap-shaped outlet opening or the outlet opening arrangement extends close to the inner wall, wherein the drop section of the curtain extends remote from the inner wall of the furnace shaft by a distance of not more than 50 mm, preferably not more than 30 mm, more preferably not more than 20 mm. This ensures a reliable expansion process and allows saving energy due to the closeness of the dropping curtain in relation to the heating elements in the inner wall of the furnace shaft. The drop section of the curtain extends at least 10 mm away from the inner wall of the furnace shaft in order to prevent contact with a boundary layer flow of heated air or gases that may optionally extend on the inner wall of the furnace shaft.

It is accordingly further provided in accordance with the invention in an apparatus for producing an expanded granulate made of sand-grain-shaped material, comprising a furnace with a substantially vertically extending furnace shaft and a feed device arranged above or in the upper region of the furnace shaft for feeding the sand-grain-shaped material to the furnace shaft, wherein the feed device is formed to introduce the sand-grain-shaped material in form of at least one downwardly falling curtain into the upper region of the furnace shaft, wherein the drop section of the curtain lies in a decentralised, preferably peripheral region of the furnace shaft cross-section, and wherein the feed device comprises at least one gap-shaped outlet opening facing the furnace shaft and/or at least one outlet opening arrangement which faces the furnace shaft and consists of several outlet openings arranged adjacently along a line in order to discharge the sand-grain-shaped material in form of a curtain into the furnace shaft, that the gap-shaped outlet opening or the outlet opening arrangement is arranged with respect to an inner wall of the furnace shaft in such a way that that the drop section of the curtain formed by the gap-shaped outlet opening or the outlet opening arrangement extends close to the inner wall, wherein the drop section of the curtain extends remote from the inner wall of the furnace shaft by a distance of not more than 50 mm, preferably not more than 30 mm, more preferably not more than 20 mm, and wherein the drop section of the curtain preferably extends remote from the inner wall of the furnace shaft by a distance of at least 10 mm.

A preferred embodiment is characterized in that the feed device comprises at least one guide surface for the sand-grain-shaped material, which is oriented obliquely in relation to the vertical and opens into an outlet opening or outlet opening arrangement facing the furnace shaft, wherein preferably the feed device comprises at least two guide surfaces which deflect the sand-grain-shaped material in opposite directions. This allows a purposeful guidance of the particles and the formation of a uniform drop curtain in the furnace shaft.

A preferred embodiment is characterized in that the feed device comprises a first conveying section with a base in order to convey the sand-grain-shaped material along a first conveying direction, wherein the base is bounded in the end region of the first conveying section by edges which extend obliquely or in a bent manner in relation to the first conveying direction and respectively form an overflow, and on which the sand-grain-shaped material leaves the first conveying section as a falling curtain in the downward direction. Curtains in different planes can be formed by this measure with the simplest of means.

Notice must be taken that the aforementioned arrangement of the gap-shaped outlet opening or the outlet opening arrangement for the formation of the curtain close to the inner walls could principally also be considered without or independent of the aforementioned first conveying section.

A preferred embodiment is characterized in that the base area narrows, preferably tapers, in the end region of the first conveying section in the conveying direction. A preferred embodiment is characterized in that the base has a notch in the end region of the first conveying section, which notch is delimited by the edges forming the overflow and preferably has a V-shaped contour (e.g. a dovetail slot). This produces a bipartite line feed.

The base of the first conveying section can be provided with a grooved configuration, so that the distribution of the grains occurs in small channels. Furthermore, feeding of at least one further grain size can occur in the region of evening out the material flow over the width. A preferred embodiment is characterized in that the first conveying section is formed as a chute and/or is connected to a vibration drive. The chute prevents lateral escape of the particle dust. The vibration device ensures the uniform distribution of the material transversely to the conveying direction and thus contributes to producing a uniform curtain (constant thickness).

A preferred embodiment is characterized in that a dosing device, especially in form of a valve, is provided upstream the first conveying section for dosing the supply of the sand-grain-shaped material. It allows optimising the density of the particles which drop in the curtain.

A preferred embodiment is characterized in that the feed device comprises a second conveying section which is arranged beneath the first conveying section and comprises a deflection device in order to twist the plane of at least one of the curtains which drops from the edges of the first conveying section. The plane of the curtains can thus be adjusted optimally to the contour of the inner walls of the furnace shaft. Furthermore, the deflection device ensures further homogenising of the dropping material curtain. The deflection device can be formed as a prism, pyramid or (truncated) comb depending on the furnace cross-section and preferably have a cross-section which increases from top to bottom.

A preferred embodiment is characterized in that the deflection device forms at least one guide surface which is oriented obliquely to the falling direction of a curtain dropping from the edges of the first conveying section.

A preferred embodiment is characterized in that a first guide surface of the deflection device is arranged beneath a first obliquely extending edge of the first conveying section and opens into a first gap-shaped outlet opening or outlet opening arrangement, and a second guide surface of the deflection device is arranged beneath a second obliquely extending edge of the first conveying section and opens into a second gap-shaped outlet opening or outlet opening arrangement. As a result, two mutually independent or spatially separated curtains can be introduced into the furnace shaft, which then drop along two different inner walls.

A preferred embodiment is characterized in that the furnace cross-section is substantially rectangular and a first drop section in form of a curtain along a first inner wall of the furnace shaft is defined by the feed device and a second drop section in form of a curtain is defined along a second inner wall of the furnace shaft, wherein preferably the first inner wall and the second inner wall are opposite each other. The two curtains which are made of sand-grain-shaped material and introduced in this manner are subject to the same conditions, thus achieving an optimal expansion process.

A preferred embodiment is characterized in that the feed device comprises a channel opening into the furnace shaft for introducing a process gas into the furnace shaft or removing said process gas from the furnace shaft by suction.

A preferred embodiment is characterized in that the channel is formed in or beneath the deflection device. This not only provides a compact design, but also allows preheating of the particles by the process gas which heats the deflection device.

A preferred embodiment is characterized in that the opening of the channel into the furnace shaft is arranged in a region between two drop sections which are defined by the feed device and are situated opposite each other. As a result, the introduction of the process gas stream is spatially separated from the drop sections. Furthermore, the process gas acts similarly on both drop sections.

A preferred embodiment is characterized in that the opening of the channel into the furnace shaft is closer to the centre of the furnace cross-section than the at least one gap-shaped outlet opening or the at least one outlet opening arrangement.

A preferred embodiment is characterized in that an opening of the channel into the furnace shaft is arranged in the central region of the furnace shaft cross-section. The closeness of the opening to the centre already leads to the aforementioned effect that that the drop sections extending close to the inner wall are not influenced negatively by the process gas flow.

The object is also achieved by a method for producing an expanded granulate from sand-grain-shaped material, especially mineral material with an expanding agent such as pearlite or obsidian sand, wherein the material is introduced via a feed device from above into a furnace with a substantially vertically extending furnace shaft and drops along at least one drop section through the furnace shaft, wherein the material is heated and is expanded as a result of the expanding agent. In this process, the sand-grain-shaped material is introduced into the upper region of the furnace shaft by the feed device in form of at least one downwardly dropping curtain, wherein the drop section of the curtain lies in a decentralised, preferably peripheral region of the furnace cross-section. The sand-grain-shaped material is preferably conveyed via a first conveying section along a first conveying direction, wherein the sand-grain-shaped material leaves the first conveying section in the downward direction as a dropping curtain which extends obliquely or in a curved manner in relation to the first conveying direction.

A preferred embodiment is characterized in that the drop section extends along an inner wall of the furnace shaft, wherein preferably the distance between the curtain made of sand-grain-shaped material and the inner wall is at most 50 mm, preferably at most 30 mm, and more preferably at most 20 mm.

A preferred embodiment is characterized in that the drop section extends along an inner wall of the furnace shaft, wherein the distance between the curtain made of sand-grain-shaped material and the inner wall is at least 10 mm.

A preferred embodiment is characterized in that process gas is introduced into or extracted by suction from the upper region of the furnace shaft, wherein the introduction or suction of the process gas occurs in a region of the furnace shaft cross-section which is close to the centre.

A preferred embodiment is characterized in that the feed device is formed according to one of the aforementioned embodiments.

A preferred embodiment of the device configuration is described below.

The core equipment of the method in accordance with the invention is formed by an expansion shaft which is formed as a rectangle and is heated from the outside. The energy transfer to the dropping particles preferably occurs via an electrical resistance heating by means of radiation.

The quantitative dosing of the material can or should still occur by means of conventional dosing devices such as a rotary feeder, a dosing worm, a corrugated roll feeder and the like. This mass flow determined in this manner is evenly distributed at first over the width (e.g. by means of a vibration drive) through a specially formed feed chute (first conveying section) and subsequently divided into two equal parts. Two material curtains are formed which are guided like a waterfall over the oblique edges of the first conveying section. The material curtains produced in this manner are subsequently twisted into a parallel orientation with two opposite inner walls of the furnace shaft and supplied to the furnace shaft. It is the object to supply the two material curtains as close to the wall as possible (e.g. 10 to 15 mm away from the wall) to the shaft. It is achieved by this form of feeding that the material is introduced in the region of the upwardly flowing boundary layer. A relatively constant dwell time of the material particles in the furnace shaft is ensured by this measure and the suction of hot air in the region between the two linear feeds of the material (i.e. curtains) close to the wall. The suction quantity between the linear material feeds (i.e. curtains) can be set or controlled depending on the supplied grain sizes.

BRIEF DESCRIPTION OF THE DRAWINGS

Preferred embodiments of the invention will be described below in closer detail by reference to the drawings, wherein.

DETAILED DESCRIPTION OF THE PREFERRED EMBODIMENTS

Figure 1:
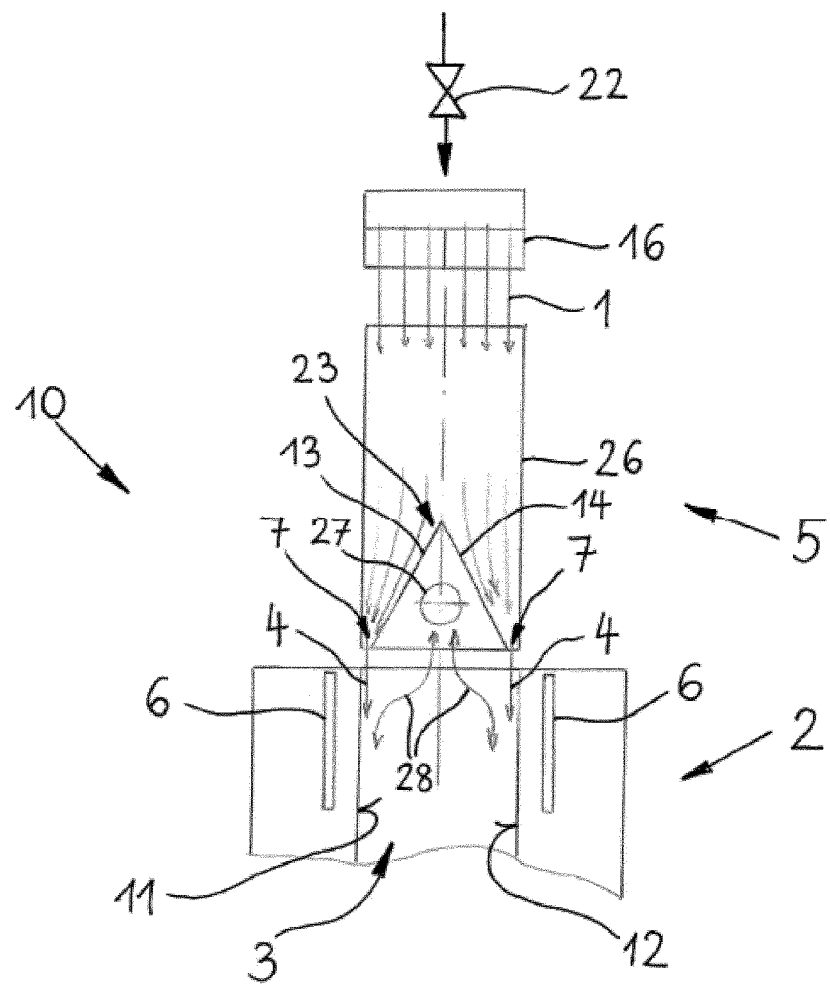
FIG. 1 shows an apparatus in accordance with the invention for producing an expanded granulate made of sand-grain-shaped material.

FIG. 1 shows an apparatus 10 for producing an expanded granulate from sand-grain-shaped material 1, comprising a furnace 2 with a substantially vertically extending furnace shaft 3 and a feed device 5 arranged above the furnace shaft 3 or in the upper region thereof for feeding the sand-grain-shaped material 1 to the furnace shaft 3.

The feed device 5 is formed to introduce the sand-grain-shaped material 1 in form of at least one downwardly falling curtain 25 into the upper region of the furnace shaft 3 (FIG. 7), wherein the drop section 4 of the curtain 25 lies in a decentralised (here: peripheral) region of the furnace shaft cross-section.

Figure 7:
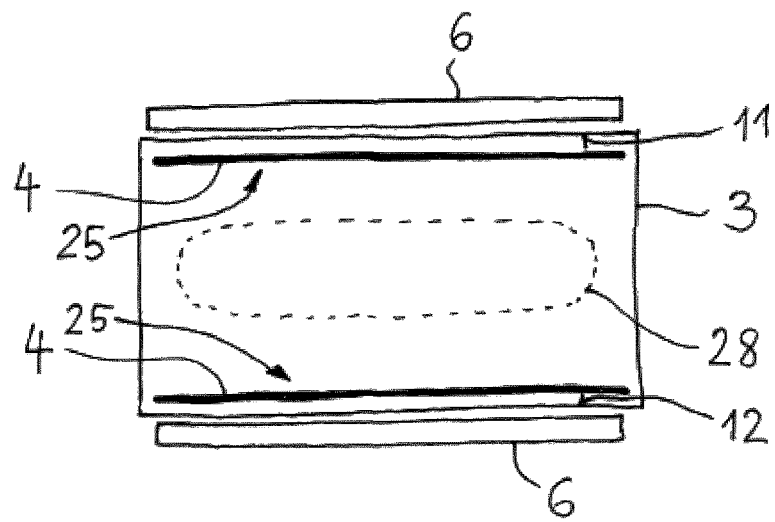
FIG. 7 shows a furnace with a rectangular furnace shaft cross-section in a sectional view.

The feed device 5 of FIG. 1 comprises two elongated gap-shaped outlet openings 7 facing the furnace shaft 3 in order to discharge the sand-grain-shaped material 1 in form of a curtain 25 to the furnace shaft 3 (FIG. 7).

Figure 6:
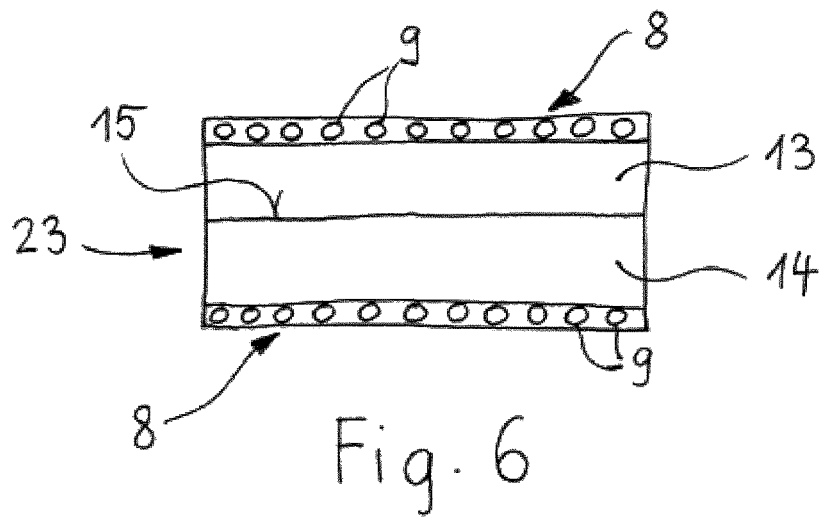
FIG. 6 shows a variant of the invention with an outlet opening arrangement consisting of several outlet openings.

Instead of an elongated gap-shaped outlet opening it is also possible to use an outlet opening arrangement 8 made of several outlet openings 9 arranged along a line adjacent to each other. Such an embodiment is shown in a top view in FIG. 6.

The gap-shaped outlet openings 7 (FIGS. 1 and 5) or the outlet opening arrangements 8 (FIG. 6) extend substantially parallel to the mutually opposite inner walls 11, 12 of the furnace shaft 3.

The gap-shaped outlet openings 7 or the outlet opening arrangements 8 are preferably arranged with respect to the inner walls 11, 12 of the furnace shaft 3 in such a way that the drop section 4 of the curtain 25 which is formed by the gap-shaped outlet opening 7 or the outlet opening arrangement 8 extends close to the inner wall. The drop section 4 of the curtain 25 preferably extends remote from the inner wall 11, 12 of the furnace shaft 3 at a distance of at most 30 mm, more preferably at most 20 mm.

FIG. 1 further shows the (electrical) heating elements 6 in the walls of the furnace shaft 3 for heating the particles over a critical temperature, and the supply or suction of process gas 28 through a channel 27 in the central region of the shaft 3.

The feed device 5 comprises at least one guide surface 13, 14 for the sand-grain-shaped material 1, which feed device is oriented obliquely in relation to the vertical and opens into an outlet opening 7 or outlet opening arrangement 8 facing the furnace shaft 3. In the illustrated embodiment, the feed device 5 comprises two guide surfaces 13, 14 which deflect the sand-grain-shaped material 1 in opposite directions, i.e. to the outside. The feed device 5 comprises a first conveying section 16 in which the material 1 is conveyed along a chute, and a second conveying section 26 in which the material 1 is only driven by gravity.

In the illustrated embodiments (FIGS. 1 to 4), the feed device 5 comprises a first conveying section 16 with a base 17 in order to convey the sand-grain-shaped material 1 along a first conveying direction 18.

The base 17 is delimited in the end region of the first conveying section 16 by edges 19, 20 which extend in an oblique (alternatively: curved) manner in relation to the first conveying direction 18 and respectively form an overflow on which the sand-grain-shaped material 1 leaves the first conveying section 16 as a falling curtain 24 in the downward direction.

Figure 4:
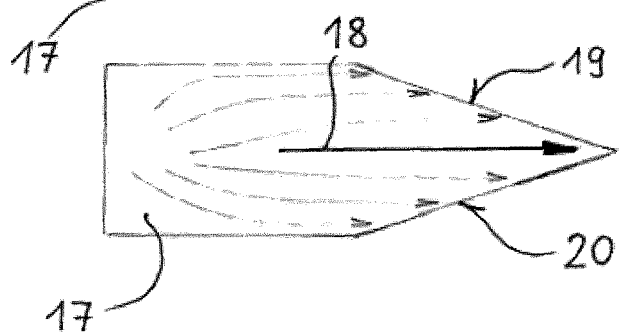
FIG. 4 shows a variant of the first conveying section from above.

In the embodiment shown in FIG. 4, the base area tapers in the conveying direction 18 in the end region of the first conveying section 16 and is pointed there.

Figure 3:
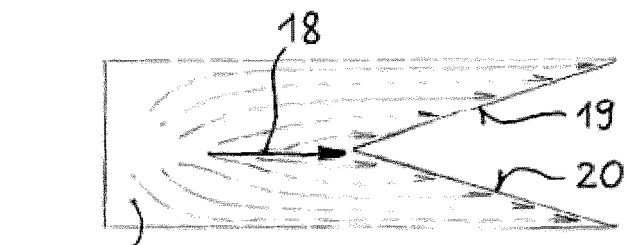
FIG. 3 shows a first conveying section from above.

In the embodiment shown in FIG. 3, the base 17 comprises an indentation in the end region of the first conveying section 16, which indentation is delimited by the edges 19, 20 forming the overflow and has a V-shaped contour.

Figure 2:
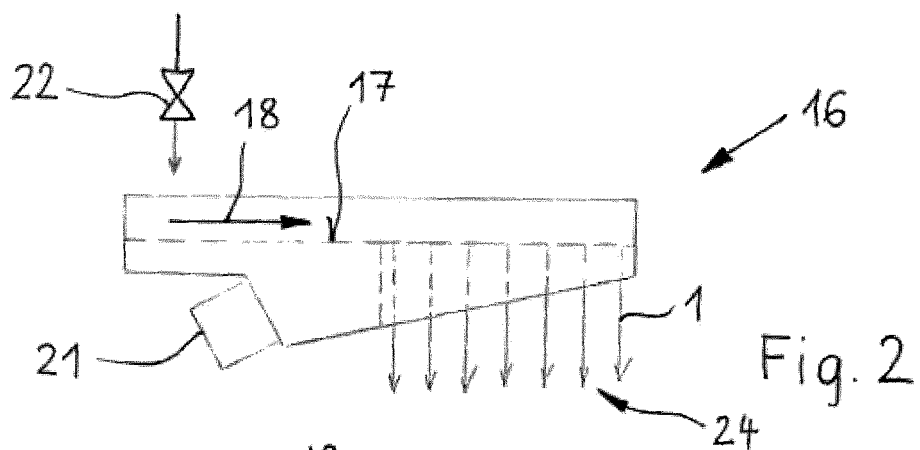
FIG. 2 shows a first conveying section of the feed device from the side.

The material stream flowing over the edges 19, 20 forms two mutually inclined dropping planes, which respectively form a curtain 24 (vertically downwardly extending arrows in FIG. 2).

The first conveying section 16 is formed as a chute and is connected to a vibration drive 21. The first conveying section 16 is provided upstream with a dosing device 22, especially in form of a valve, for dosing the supply of the sand-grain-shaped material 1 (FIGS. 1 and 2).

As is shown in FIG. 1, the feed device 5 comprises a second conveying section 26 which is arranged beneath the first conveying section 16 and comprises a deflection device 23 in order to twist the planes of the curtains 24 dropping from the edges 19, 20 of the first conveying section 16.

For this purpose, the deflection device 23 forms two guide surfaces 13 and 14 which drop laterally in opposite directions and which are oriented obliquely in relation to the falling direction of the curtains 24. A first guide surface 13 of the deflection device 23 is arranged beneath a first obliquely extending edge 19 of the first conveying section 16 and opens into a first outlet opening 7. A second guide surface 14 of the deflection device 23 is arranged beneath a second obliquely extending edge 20 of the first conveying section 16 and opens into a second outlet opening 7.

Figure 5:
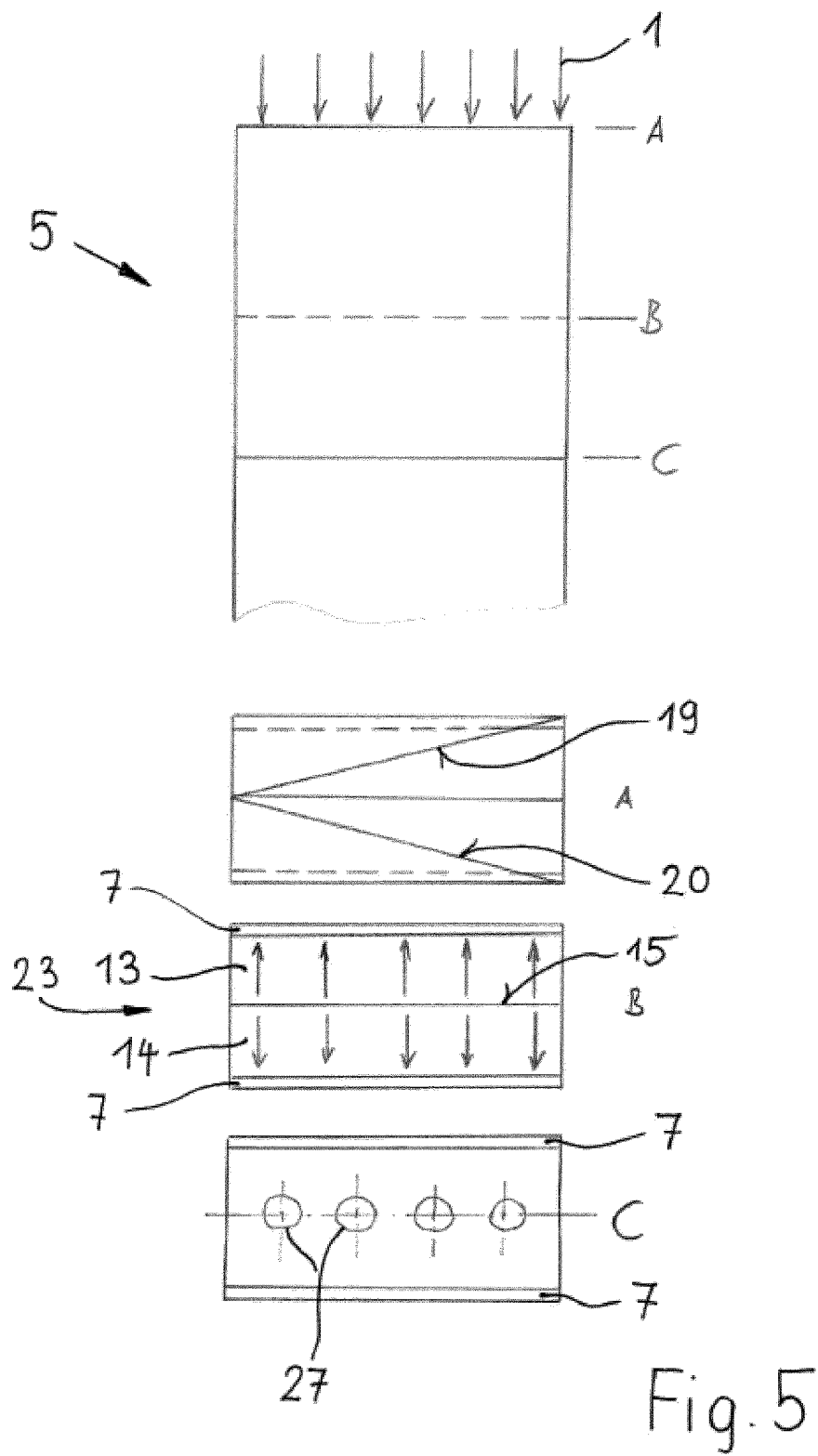
FIG. 5 shows the sequence of the conveying path within the feed device with three different sectional views.

This correlation is illustrated in FIG. 5, which in its upper section represents the vertical sequence of the entire conveying path and shows the individual functional elements in closer detail by means of the sections A, B and C. The first conveying section 16 with the oblique edges 19, 20 is disposed at the top (sectional view A). The illustration already shows the deflection device 23 with its inclined guide surfaces 13, 14 underneath, which form a common upper longitudinal edge 15. The slotted outlet openings 7 and the channel 27 for the process gas 28 which divides into several openings are shown at the bottom (sectional view C). The arrows illustrate the material flow.

The furnace shaft cross-section is substantially rectangular in the embodiment shown in FIG. 7. As a result of the feed device 5, a first drop section 4 is defined in form of a curtain 25 along a first inner wall 11 of the furnace shaft 3 and a second drop section 4 in form of a further curtain 25 along a second inner wall 12 of the furnace shaft 3. The first inner wall 11 and the second inner wall 12 lie opposite each other. It can obviously be considered that the material curtains fall downwardly along all four inner walls of the furnace shaft 3.

Figure 8:
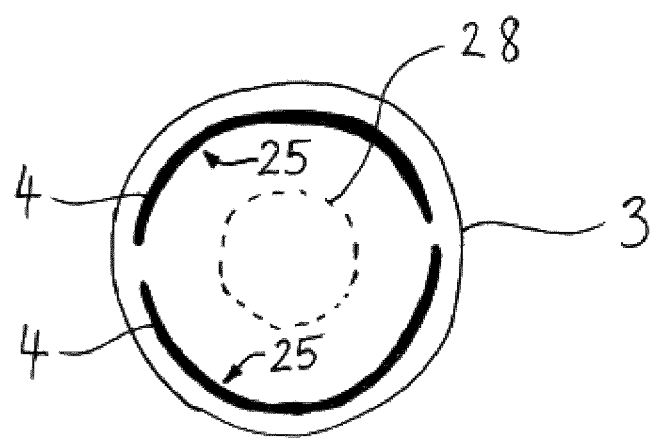
FIG. 8 shows a variant of the invention with a circular furnace shaft cross-section.

FIG. 8 shows an alternative embodiment in which the furnace shaft cross-section is circular and the contour of the drop curtains 25 (or the contour of the outlet openings) is adjusted to the circular contour of the inner wall.

The feed device 5 further comprises a channel 27 opening into the furnace shaft 3 for introducing a process gas 28 into the furnace shaft 3, or for extracting said process gas by means of suction from said shaft. The channel 27 is formed as a borehole for example in the deflection device 23 in the illustrated preferred embodiment (FIGS. 1 and 5).

The opening of the channel 27 into the furnace shaft 3 is arranged in a region between the two drop sections 4 defined by the feed device 5 and situated opposite each other (FIGS. 1 and 5).

In FIG. 8, the opening of the channel 27 into the furnace shaft 3 occurs in the central region of the furnace cross-section (indicated by the dashed circular line of the process gas 28). In any case, the opening of the channel 27 into the furnace shaft 3 is closer in both embodiments to the centre of the furnace shaft cross-section than the at least one gap-shaped outlet opening 7 or the at least one outlet opening arrangement 8.

The method for producing an expanded granulate from sand-grain-shaped, and especially mineral material 1 with an expanding agent made of pearlite or obsidian sand for example occurs in such a way that the material 1 is introduced by the feed device 5 from above into a furnace 2 with the substantially vertically extending furnace shaft 3 and drops along at least one drop section 4 through the furnace shaft 3. In this process, the material 1 is heated by heating element 6 situated in the wall of the furnace shaft (FIGS. 1 and 7) and expanded as a result of the expanding agent. In accordance with the invention, the sand-grain-shaped material 1 is introduced by the feed device 5 in form of at least one downwardly falling curtain 25 into the upper region of the furnace shaft 3, wherein the drop section 4 of the curtain 25 lies in a decentralised, preferably peripheral region of the furnace shaft cross-section.

The drop section 4 extends along an inner wall 11, 12 of the furnace shaft 3, wherein preferably the distance between the curtain 25 from sand-grain-shaped material 1 and the inner wall 11, 12 is at most 30 mm, more preferably at most 20 mm. Process gas 28, e.g. hot air, is introduced into the upper region of the furnace shaft 3 or is extracted therefrom by suction, wherein the introduction or suction of the process gas 28 occurs in a region of the surface cross-section close to the centre.

The invention is not limited to the described embodiments and the aspects emphasised there. Instead, a number of modifications are possible within the concept of the invention which lie within the scope of the skills of a person skilled in the art. It is similarly possible to realise further embodiments by a combination of the aforementioned means features without departing from the scope of the invention.

The invention claimed is:

1. An apparatus for producing an expanded granulate from sand-grain-shaped material, comprising a furnace with a substantially vertically extending furnace shaft and a feed device arranged above or in the upper region of the furnace shaft for feeding the sand-grain-shaped material to the furnace shaft, wherein the feed device is formed to introduce the sand-grain-shaped material in form of at least one downwardly falling curtain into the upper region of the furnace shaft by at least one outlet opening arrangement which faces the furnace shaft and includes several outlet openings arranged adjacently along a line, in order to discharge the sand-grain-shaped material in form of a curtain into the furnace shaft, wherein a drop section of the curtain lies in a decentralised region of the furnace shaft cross-section and goes through the furnace shaft, wherein the feed device comprises a first conveying section with a base in order to convey the sand-grain-shaped material along a first conveying direction, wherein the base is bounded in the end region of the first conveying section by edges which extend obliquely or in a bent manner in relation to the first conveying direction and respectively form an overflow, and on which the sand-grain-shaped material leaves the first conveying section as a falling curtain in the downward direction.

2. The apparatus according to claim 1, characterized in that the gap-shaped outlet opening or the outlet opening arrangement extends substantially parallel to at least one inner wall of the furnace shaft.

3. The apparatus according to claim 1, characterized in that the gap-shaped outlet opening or the outlet opening arrangement is arranged in relation to an inner wall of the furnace shaft in such a way that the drop section of the curtain formed by the gap-shaped outlet opening or the outlet opening arrangement extends close to the inner wall, wherein the drop section of the curtain extends remote from the inner wall of the furnace shaft by not more than 50 mm.

4. The apparatus according to claim 1, characterized in that the gap-shaped outlet opening or the outlet opening arrangement is arranged in relation to an inner wall of the furnace shaft in such a way that the drop section of the curtain formed by the gap-shaped outlet opening or the outlet opening arrangement extends at least 10 mm away from the inner wall of the furnace shaft.

5. The apparatus according to claim 1, characterized in that the feed device comprises at least one guide surface for the sand-grain-shaped material, which guide surface is oriented obliquely in relation to the vertical and opens into an outlet opening or outlet opening arrangement facing the furnace shaft, wherein the feed device comprises at least two guide surfaces which deflect the sand-grain-shaped material in opposite directions.

6. The apparatus according to claim 1, characterized in that the base area narrows in the end region of the first conveying section in the conveying direction.

7. The apparatus according to claim 1, characterized in that the base has a notch in the end region of the first conveying section, which notch is delimited by the edges forming the overflow and has a V-shaped contour.

8. The apparatus according to claim 1, characterized in that the first conveying section is formed as a chute and/or is connected to a vibration drive.

9. The apparatus according to claim 1, characterized in that a dosing device, in form of a valve, is provided upstream the first conveying section for dosing the supply of the sand-grain-shaped material.

10. The apparatus according to claim 1, characterized in that the feed device comprises a second conveying section Which is arranged beneath the first conveying section and comprises a deflection device, in order to twist the plane of at least one of the curtains which drops from the edges of the first conveying section.

11. The apparatus according to claim 10, characterized in that the deflection device forms at least one guide surface which is oriented obliquely to the falling direction of a curtain dropping from the edges of the first conveying section.

12. The apparatus according to claim 10, characterized in that a first guide surface of the deflection device is arranged beneath a first obliquely extending edge of the first conveying section and opens into a first gap-shaped outlet opening or outlet opening arrangement, and a second guide surface of the deflection device is arranged beneath a second obliquely extending edge of the first conveying section and opens into a second gap-shaped outlet opening or outlet opening arrangement.

13. The apparatus according to claim 1, characterized in that the furnace cross-section is substantially rectangular and a first drop section in form of a curtain along a first inner wall of the furnace shaft is defined by the feed device, and a second drop section in form of a curtain is defined along a second inner wall of the furnace shaft, wherein the first inner wall and the second inner wall are opposite each other.

14. The apparatus according to claim 1, characterized in that the feed device comprises a channel opening into the furnace shaft for introducing a process gas into the furnace shaft or for extracting said process gas from the furnace shaft by suction.

15. The apparatus according to claim 14, characterized in that the channel is formed in or beneath a deflection device.

16. The apparatus according to claim 14, characterized in that the opening of the channel into the furnace shaft is arranged in a region between two drop sections which are defined by the feed device and are situated opposite each other.

17. The apparatus according to claim 14, characterized in that the opening of the channel into the furnace shaft is closer to the centre of the furnace cross-section than at least one gap-shaped outlet opening or at least one outlet opening arrangement.

18. The apparatus according to claim 14, characterized in that an opening of the channel into the furnace shaft is arranged in the central region of the furnace shaft cross-section.

19. The apparatus according to claim 1 wherein the curtain extends remote from the inner wall of the furnace shaft by not more than 50 mm.

20. The apparatus according to claim 1 wherein the curtain extends remote from the inner wall of the furnace shaft not more than 30 mm.

21. The apparatus according to claim 1 wherein the curtain extends remote from the inner wall of the furnace shaft not more than 20 mm.

22. A method for producing an expanded granulate from sand- grain-shaped material with an expanding agent, wherein the material is introduced via a feed device from above into a furnace with a substantially vertically extending furnace shaft and falls along at least one drop section through the furnace shaft, wherein the material is heated and expanded as a result of the expanding agent, wherein the sand-grain-shaped material is introduced into the upper region of the furnace shaft by the feed device in form of at least one downwardly dropping curtain, wherein the drop section of the curtain lies in a decentralised region of the furnace cross-section, wherein the sand-grain-shaped material is conveyed via a first conveying section along a first conveying direction, and the sand-grain-shaped material leaves the first conveying section in the downward direction as a dropping curtain which extends obliquely or in a curved manner in relation to the first conveying direction.

23. The method according to claim 22, characterized in that the drop section extends along an inner wall of the furnace shaft, wherein a distance exists between the curtain made of sand-grain-shaped material and the inner wall.

24. The method according to claim 23 wherein the curtain extends from the inner wall by not more than 50 mm.

25. The method according to claim 23 wherein the curtain extends from the inner wall by not more than 30 mm.

26. The method according to claim 23 wherein the curtain extends from the inner wall by not more than 20 mm.

27. The method according to claim 22, characterized in that the drop section extends along an inner wall of the furnace shaft, wherein the distance between the curtain made of sand-grain-shaped material and the inner wall is at least 10mm.

28. The method according to claim 22, characterized in that process gas is introduced into or extracted by suction from thy: upper region of the furnace shaft, wherein the introduction or suction of the process gas occurs in a region of the furnace shaft cross-section which is close to the centre.

29. The method according to claim 22, characterized in that the feed device comprises a first conveying section with a base in order to convey the sand-grain-shaped material along a first conveying direction, wherein the base is bounded in the end region of the first conveying section by edges which extend obliquely or in a bent manner in relation to the first conveying direction and respectively form an overflow, and on which the sand-grain-shaped material leaves the first conveying section as a falling curtain in the downward direction.

* * * * *

UNITED STATES PATENT AND TRADEMARK OFFICE
CERTIFICATE OF CORRECTION

PATENT NO. : 10,174,998 B2
APPLICATION NO. : 15/038655
DATED : January 8, 2019
INVENTOR(S) : Ernst Erwin Brunnmair It is certified that error appears in the above-identified patent and that said Letters Patent is hereby corrected as shown below:

In the Claims

In Column 12, Claim 10, Line 7:
DELETE "Which" before is
INSERT --which-- before is In Column 14, Claim 28, Line 8:
DELETE "thy:" after from
INSERT --the-- after from Signed and Sealed this
Nineteenth Day of March, 2019

Andrei Iancu
*Director of the United States Patent and Trademark Office*